United States Patent [19]

Tanikawa et al.

[11] Patent Number: 5,032,820
[45] Date of Patent: Jul. 16, 1991

[54] TWO-WIRE TELEVISION INTERPHONE SYSTEM

[75] Inventors: Yoshihiro Tanikawa; Yoshikazu Minakuchi; Yoshiaki Ueno; Masahiko Amano; Muneo Suzuki; Kazuhito Kayanoki, all of Kadoma, Japan

[73] Assignee: Matsushita Electric Works, Ltd., Japan

[21] Appl. No.: 436,244

[22] Filed: Nov. 14, 1989

[30] Foreign Application Priority Data

Nov. 19, 1988 [JP] Japan ................. 63-293347
Apr. 7, 1989 [JP] Japan ................. 1-89500
Apr. 9, 1989 [JP] Japan ................. 1-88678
Apr. 25, 1989 [JP] Japan ................. 1-105191
Sep. 4, 1989 [JP] Japan ................. 1-229596

[51] Int. Cl.$^5$ ................. H04M 11/04; H04N 7/10
[52] U.S. Cl. ................. 340/310 R; 340/310 A; 358/85; 358/86; 358/108; 379/53; 379/171
[58] Field of Search ............... 340/310 R, 310 A, 538; 358/85, 86, 108; 379/53, 54, 103-105, 171; 455/4-6

[56] References Cited

U.S. PATENT DOCUMENTS

| | | | |
|---|---|---|---|
| 3,723,653 | 3/1973 | Tatsuzawa | 379/53 |
| 3,816,662 | 6/1974 | Shaver et al. | 358/85 |
| 3,999,006 | 12/1976 | Takeuchi et al. | 358/85 |
| 4,427,847 | 1/1984 | Hofmann et al. | 358/85 |
| 4,645,872 | 2/1987 | Pressman et al. | 379/54 |
| 4,893,326 | 1/1990 | Duran et al. | 358/85 |
| 4,932,047 | 6/1990 | Emmons et al. | 379/53 |

OTHER PUBLICATIONS

Tektone, "Tek-View VM-Series Video Intercom" 6-1988.
Sound and Communication, Tektone, "Mobile Communications" 12-1980.

Primary Examiner—Donnie L. Crosland
Attorney, Agent, or Firm—Leydig, Voit & Mayer

[57] ABSTRACT

Two-wire television interphone system is arranged to discriminate by a line voltage discriminator incorporated in a master device a line voltage variation due to a calling operation on the side of a branch device, to actuate a voltage controller in the branch device to shift the system from standby state to operation state, and to drive a call signal generator in the branch device for actuation of a call signal receiver in the master device. The system is thus made to have a power supply circuit energized for a power supply to the system only when required for effecting the calling operation, talking between the both devices, and so on.

16 Claims, 12 Drawing Sheets

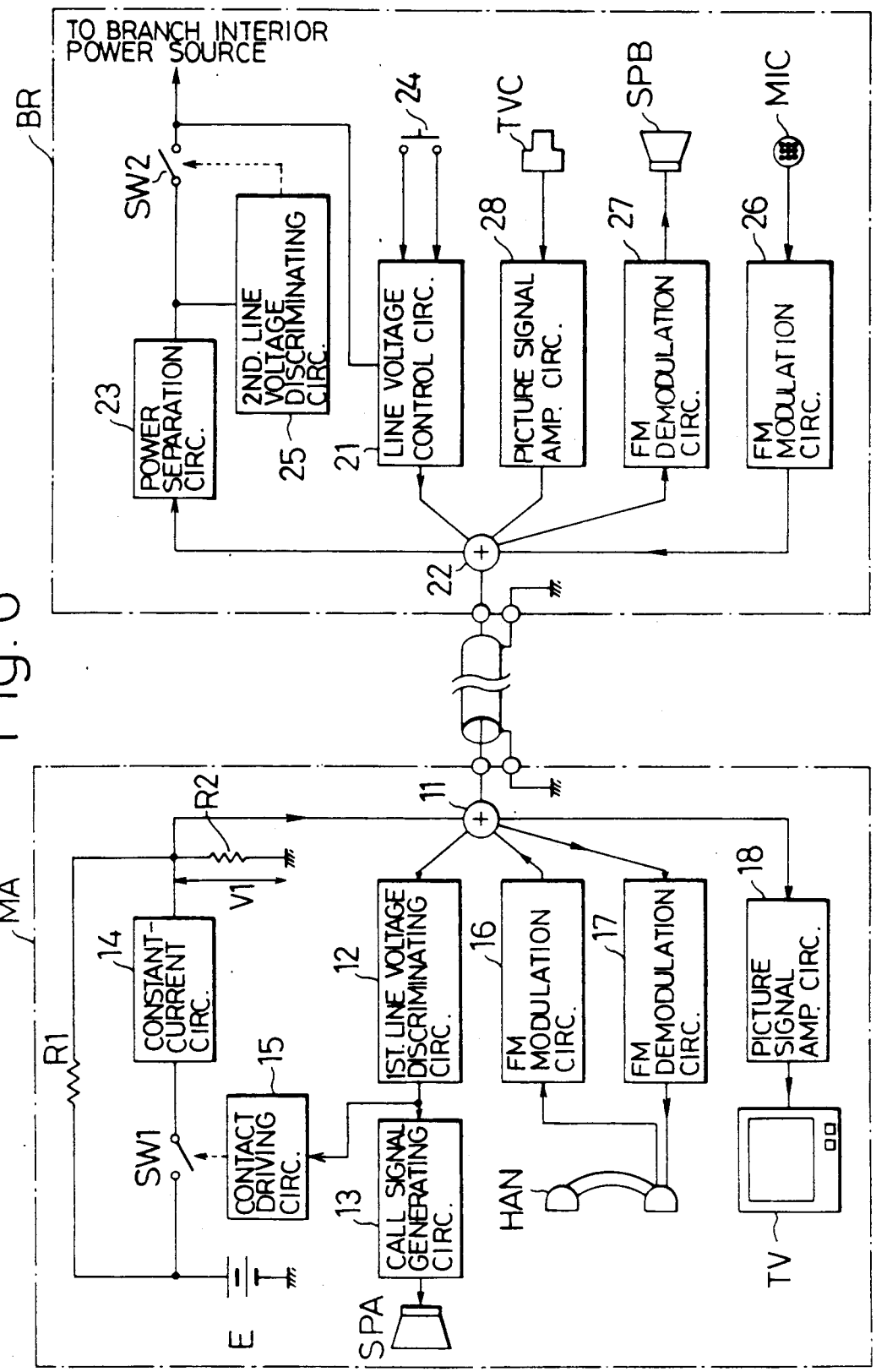

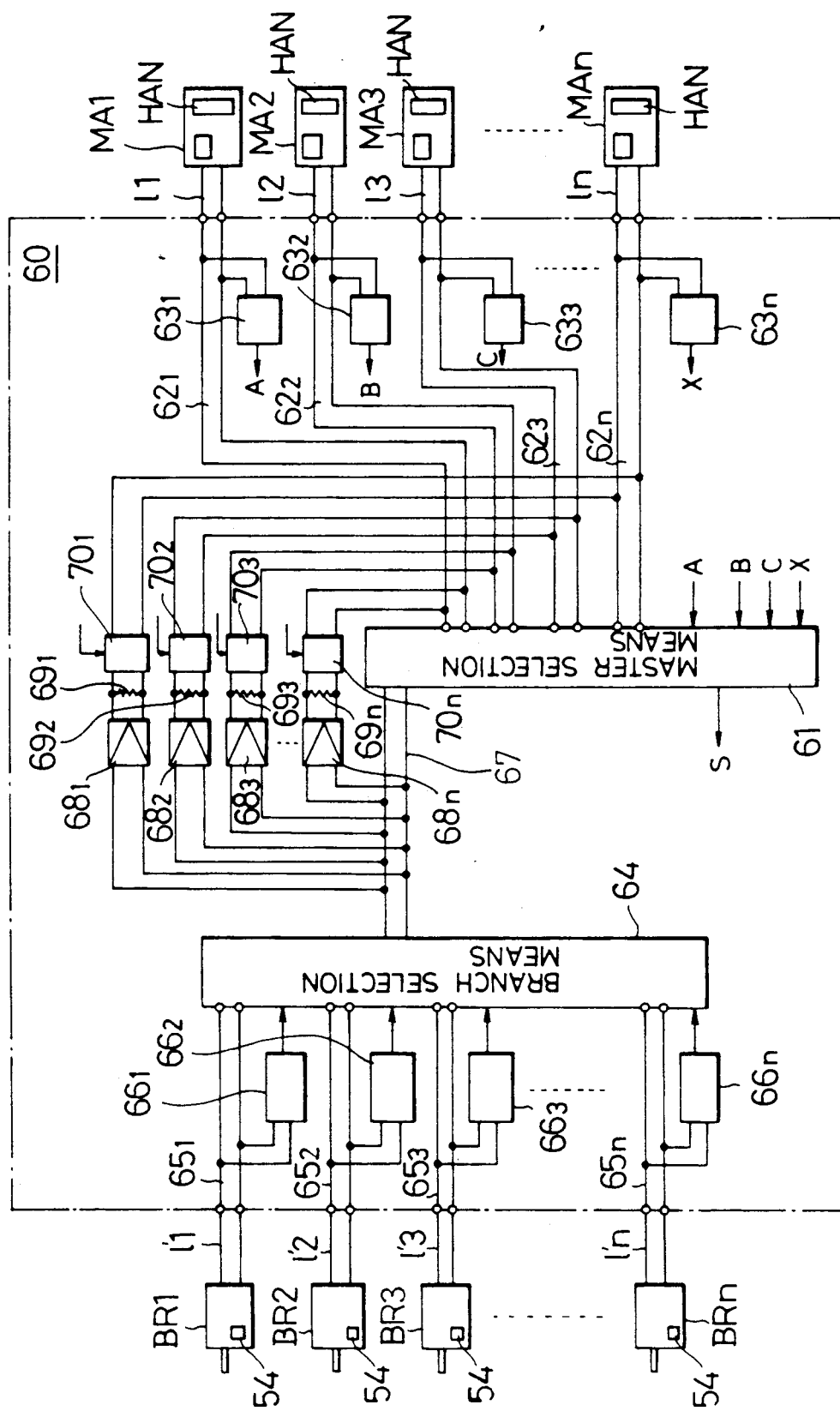

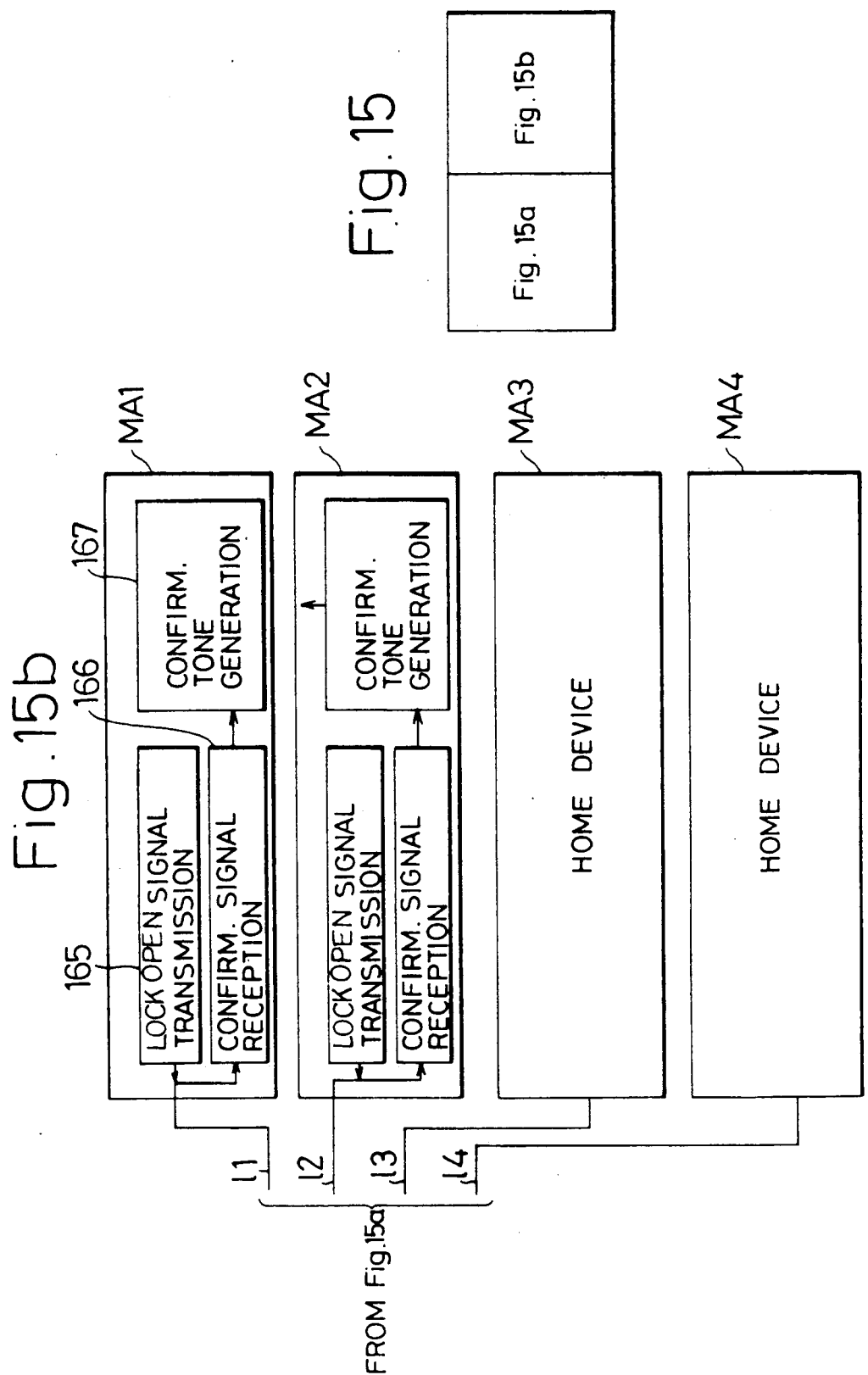

TWO-WIRE TELEVISION INTERPHONE SYSTEM

TECHNICAL BACKGROUND OF THE INVENTION

This invention relates to a two-wire television interphone system which enables a dweller to talk with a visitor at a house entrance or the like position while performing visual confirmation of the visitor.

The television interphone system may be utilized highly effectively in particular for crime prevention or the like purposes.

DISCLOSURE OF PRIOR ART

There has been increasingly used recently the television interphone system in which a television camera is provided to a branch interphone device installed at the house entrance or the like place while a master interphone device inside the house is equipped with a television monitor so as to enable the dweller to talk with the visitor at the entrance or the like position while visually confirming who the visitor is.

In the television interphone system of the kind referred to, a depression by the visitor outside the entrance door of a call button on the branch device at the entrance causes a call signal transmitted therefrom to the master device of the system at a position inside the user's house, a calling tone is thereby produced with a speaker in the master device, and concurrently a power is supplied to the television camera in the branch device and the television monitor in the master device so as to have image signals of the visitor taken by the camera and transmitted through a signal line to the master device for being visualized on the monitor. As the user takes up a handset of the master device, the system is placed into a state allowing a line talk carried out between the master and branch devices. It will be appreciated, therefore, that the user of the system is enabled to talk with the visitor outside the house entrance while monitoring the image of the visitor so that, when the visitor is determined to be, for example, an undesirable salesman, the user can finish the reception only through the line talk on the interphone, and thus the system is very useful crime prevention or the like purpose.

For the television interphone system of the kind referred to, there have been suggested various type systems in, for example, Utility Model Publications No. 63-20209 of T. Suzuki et al and Japanese Patent Appln. Laid-Open No. 1-98361 of M. Suga et al (while the latter has been laid open only after first and second priority dates claimed for the present invention and is not a relevant prior art made known to public prior to the filing of the present invention), which are involving, however, a problem that the master device is always supplying a power to the branch device even in standby period so that respective circuit elements will have to be kept in the stat of being subjected to a voltage application and thus to be deteriorated in the durability. Another problem is that such full-time power supply renders consumed power to be large.

SUMMARY OF THE INVENTION

A primary object of the present invention is, therefore, to provide a two-wire television interphone system which is arranged not to supply a power to system-forming circuits normally but to supply the power only when required for effecting the calling, talking and the like operation, so that all circuit elements will have improved durability while the amount of consumed power is reduced and the system can be simplified circuit arrangement and made more compact.

According to the present invention, this object can be realized by means of a two-wire television interphone system which comprises a master device to be installed inside the user's house and including a power supply means, talking means, call-signal receiving means and television monitor, a branch device to be installed outside the house for use by a visitor and including a power source means, calling means, call-signal generating means, talking means and television camera, and a two-wire signal line connected between the master and branch devices exclusively for transmitting therethrough a call signal, voice signal, image signal and power as superposed on each other. The call-signal receiving means in the master device is made to respond through the two-wire signal line to the call signal due to an operation by the visitor of the call means in the branch device, and the talking means and television camera in the branch device are enabled by an operation by the user of the talking means in the master device to carry out a talk and to have an image of the visitor taken and visualized on the monitor in the master device, characterized in that the master device is provided with means for discriminating a line voltage variation upon reception of the call signal, and the branch device is provided with a line voltage control means operatively connected to the call-signal generating means, so that the line voltage control means will be driven by the line voltage discriminating means for shifting between two states of standby and operation upon discrimination of the line voltage variation so as to actuate the call-signal generating means in the branch device.

Other objects and advantages of the present invention shall be made clear in following description of the invention detailed with reference to embodiments shown in accompanying drawings.

BRIEF EXPLANATION OF THE DRAWINGS

FIG. 6 is a block diagram of the whole of the system of FIG. 1;

FIG. 8 is a detailed circuit diagram of the system of FIG. 7;

Figure 1:
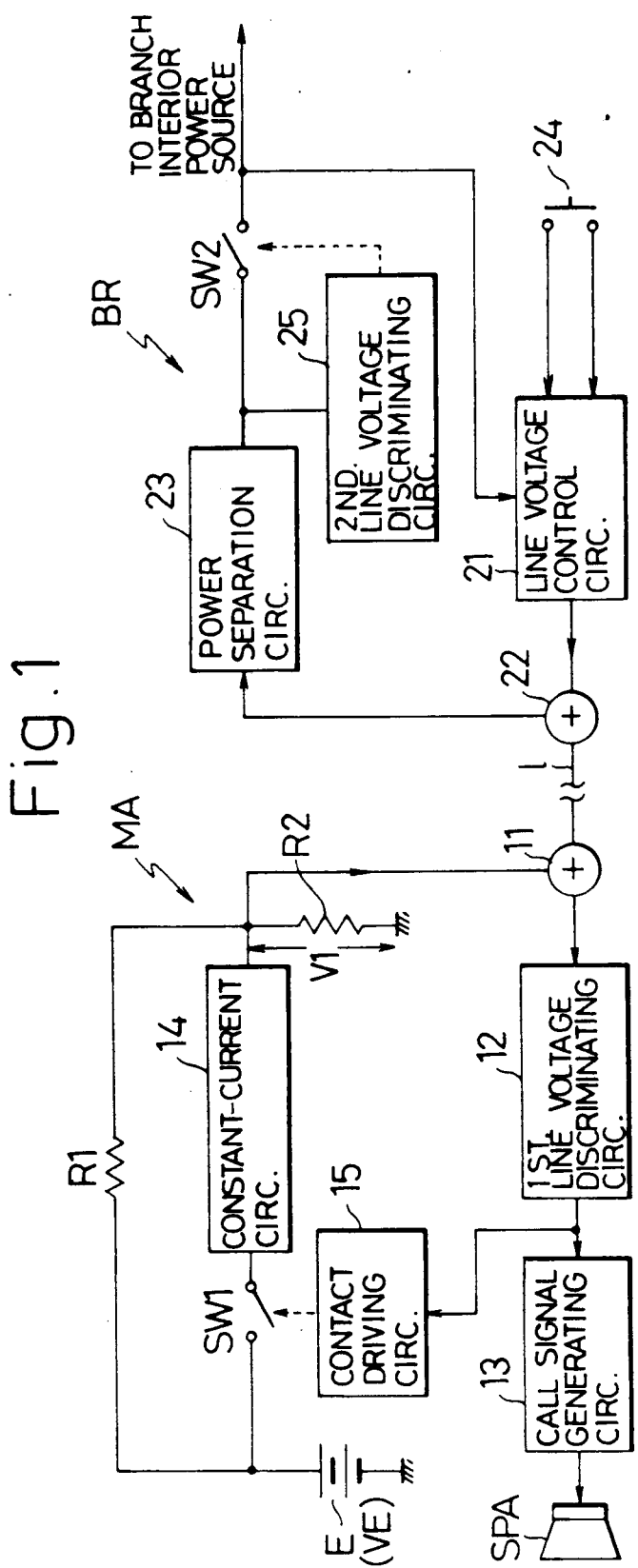
FIG. 1 is a block diagram showing a main part in an embodiment of the two-wire television interphone system according to the present invention.

While the present invention shall now be explained in detail with reference to the respective embodiments shown in the drawings, it will be appreciated that the intention is not to limit the invention only to the embodiments shown but rather to include all modifications, alterations and equivalent arrangements possible within the scope of appended claims.

DISCLOSURE OF PREFERRED EMBODIMENTS

Referring to FIG. 1 showing the two-wire television interphone system in an embodiment according to the present invention, the system generally comprises a master device MA, a branch device BR and a two-wire signal line 1 connecting between the both devices, and the master device MA includes a balanced input/output circuit 11 through which the device is connected to the signal line 1, first line-voltage discriminating circuit 12 connected through the circuit 11 to the signal line for discriminating voltage level of the line, a call-signal generating circuit 13 connected to the first line-voltage discriminating circuit 12 to be driven by a drive signal from the circuit 12, a speaker SPA receiving a call signal from the circuit 13, a direct current source E having a voltage VE, a constant current cirucit 14 connected through a power supply switch SW1 to the source E and also to voltage dividing resistors R1 and R2, and a contact driving circuit 15 interlocked with the power supply switch SW1 and energized by a drive signal from the first line-voltage discriminating circuit 12 for maintaining a movable contact of the switch SW1 in its closed state so long as the circuit 15 is energized.

The branch device BR includes, on the other hand, a line voltage control circuit 21 connected through a balanced input/output circuit 22 to the signal line 1, a power separation circuit 23 connected to the circuit 22 in parallel to the line voltage control circuit 21, a push button 24 connected as a calling means to the control circuit 21, a control switch SW2 inserted between the power separation circuit 23 and a branch interior power source (not shown), and a second line-voltage discriminating circuit 25 connected also to the power separation circuit 23 for discriminating the voltage level on the signal line z, so that a movable contact of the control switch SW2 will be kept in its closed state by a drive signal from the second line-voltage discriminating circuit 25.

Figure 4:
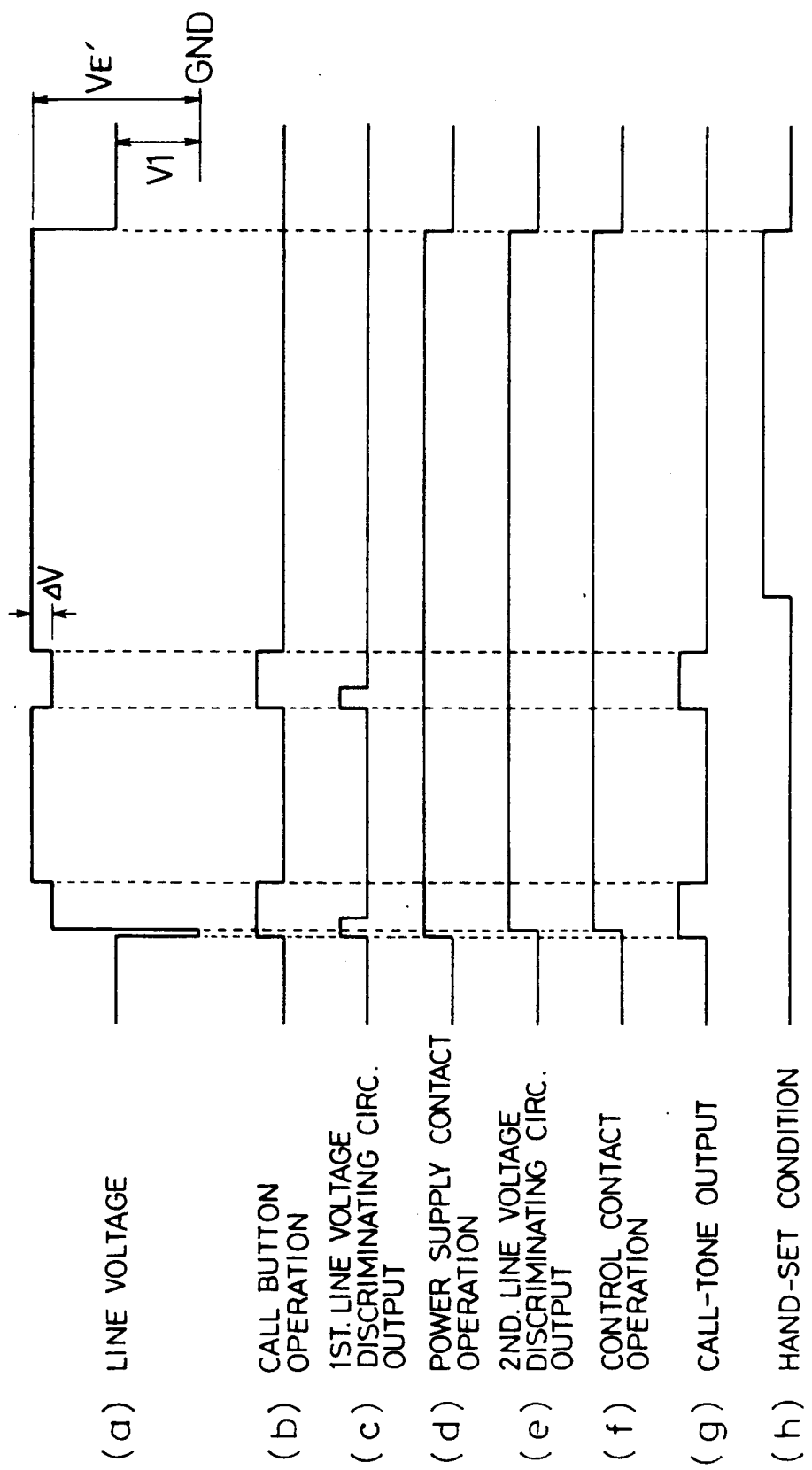
FIG. 4 is a time chart showing operation at respective parts in the system of FIG. 1.

Referring to the operation of the foregoing system with further reference to FIG. 4, the system is now assumed here to be in its state of not being used, that is, to be on standby, in which the power supply switch SW1 in the master device MA and the control switch SW2 in the branch device BR are in open state, and such a voltage V1 into which the voltage VE of the DC source E is divided by the resistors R1 and R2 in the master device MA as shown by waveform (a) in FIG. 4 is applied to the signal line 1. When the push button 24 of the branch device BR is operated in this standby condition, the voltage level on the signal line 1 is lowered to zero level by the line voltage control circuit 21. This voltage level drop is discriminated by the first line-voltage discriminating circuit 12 in the master device MA and, concurrently, the power supply switch SW1 is caused to be closed and so maintained by the contact driving circuit 15 to have the drive signal provided to the call-signal generating circuit 13, and the thus generated call signal causes a call tone to be produced by the speaker SPA (see waveforms (a) to (d) and (g) in FIG. 4). Due to the closure of the power supply switch SW1, the voltage VE of the source E is applied through the constant current circuit 14 and balanced input/output circuit 11 to the signal line 1 as a voltage VE'.

In the branch device BR, the source voltage VE' is separated by the power separation circuit 23 out of signals as superposed from the master device through the balanced input/output circuit 22, and is provided to the second line-voltage discriminating circuit 25 supervising the voltage level of the signal line 1 to have the control switch SW2 closed so that the interior power will be supplied to the branch device BR, and the system comes into an acting state (see waveforms (a), (e) and (f) in FIG. 4).

Provided that the push button 24 is depressed again in this acting state of the system, the voltage VE' on the signal line 1 is caused by the line voltage control circuit 21 to drop by a predetermined value $\Delta V$. Since this voltage drop $\Delta V$ is discriminated by the first line-voltage discriminating circuit 12 in the master device MA, the drive signal is thereby provided to the call-signal generating circuit 13, and the speaker SPA is actuated again to produce the call tone. While the drive signal is concurrently provided from the first line-voltage discriminating circuit 12 to the contact driving circuit 15, the power supply switch SW1 already turned into the closed state is just kept in the closed state (see waveforms (a)-(c) and (g) in FIG. 4).

While in the foregoing the reference has been made to that the first line-voltage discriminating circuit 12 is to discriminate the voltage level drop approximately to 0V during the standby condition of the system as well as at least by the predetermined value $\Delta V$ or more during the acting condition and to provide the drive signal, the discriminating voltage drop may not be limited to this, but it is also possible to drive the power supply switch SW1 and call-signal generating circuit 13, for example, in a manner changeable with a plurality of threshold values set preliminarily and with the control voltage varied correspondingly by the line voltage control circuit 21 in the branch device BR.

In the second line-voltage discriminating circuit 25 of the branch device BR, on the other hand, it is preferable to set a threshold level to be between voltages $VE'-\Delta V$ and V1, so as to open the control switch SW2 when the voltage level on the signal line 1 is V1 and to close the control switch SW2 when the signal line voltage level is VE' or $VE'-\Delta V$ for supplying the power to the branch device BR (see waveforms (a), (e) and (f) in FIG. 4). Further, as will be appreciated, the retaining operation of the contact driving circuit 15 is interrupted when the handset of the master device MA is hung up upon termination of the talk, the power supply switch SW1 and control switch SW2 are thereby opened to return the system to be on standby (see waveforms (d) and (h) in FIG. 4).

Figure 2:
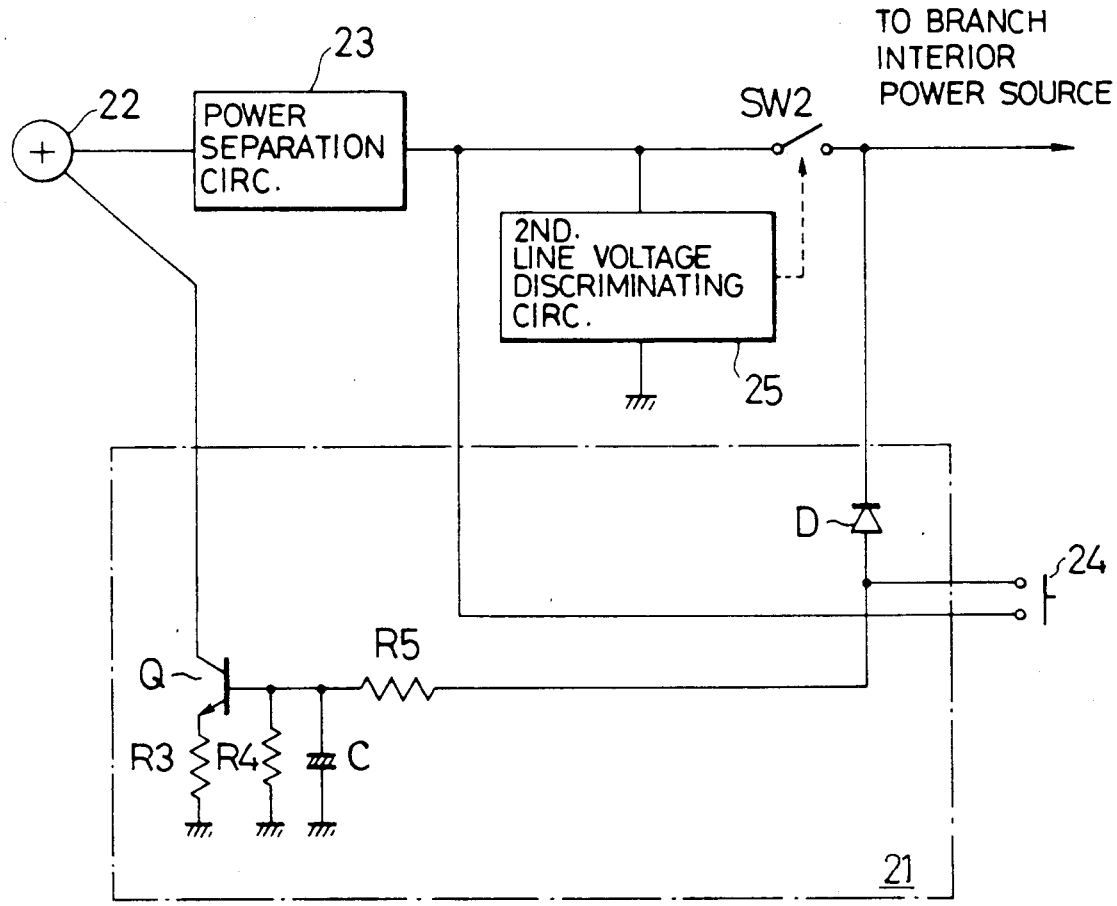
FIG. 2 is a practical circuit diagram in a working aspect of a line voltage control circuit employed in the system of FIG. 1.
Figure 3:
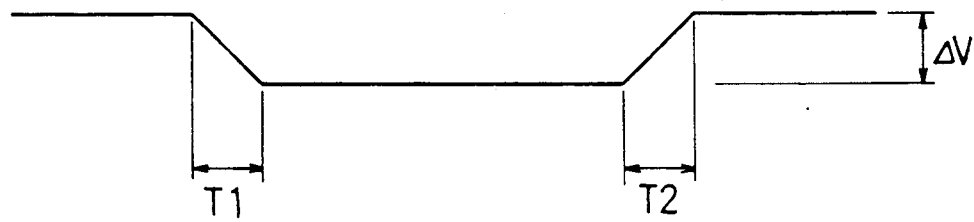
FIG. 3 is a diagram showing a variation in voltage level of signal line in the system of FIG. 1.

Referring more specifically to the line-voltage control circuit 21 in the branch device BR with reference to FIG. 2 which showing a practical example of the circuit 21, the operation of the calling push button 24 in the acting state of the system with the power supply and control switches SW1 and SW2 closed causes a diode D turned OFF, a driving voltage is applied through resistors R5 and R4 to a base of a transistor Q, and the voltage level on the signal line z is thereby caused to be dropped to the value $VE'-\Delta V$. This voltage variation occurring abruptly on the signal line 1 due to the operation of the calling push button 24 is to normally give to an image signal being transmitted through the signal line 1 from a television camera in the branch device BR as superposed on the voltage an influence so that an image on a monitor television provided in the master device MA will involve a turbulence. In the present invention, however, a capacitor C is connected between the base and emitter of the transistor Q so that the voltage drop $\Delta V$ due to the operation of the calling push button 24 will take place after such a down-slope type delay time T1 as shown in FIG. 3, the time T1 being determined by a time constant of the resistor R5 and capacitor C and the source voltage $VE'$ will be restored upon release of the button 24 also after such an up-slope type delay time T2 as in FIG. 3, T2 being determined by a time constant of the resistor R4 and capacitor C, and the influence on the image signal is thereby avoided from occurring. According to the instant example of the line voltage control circuit 21 of FIG. 2, further, the arrangement is so made that the diode D will carry out the change-over of the control with respect to the signal line 1 by the control circuit 21, and it is thereby made possible to realize the highly reliable operation with the simple arrangement.

Figure 5:
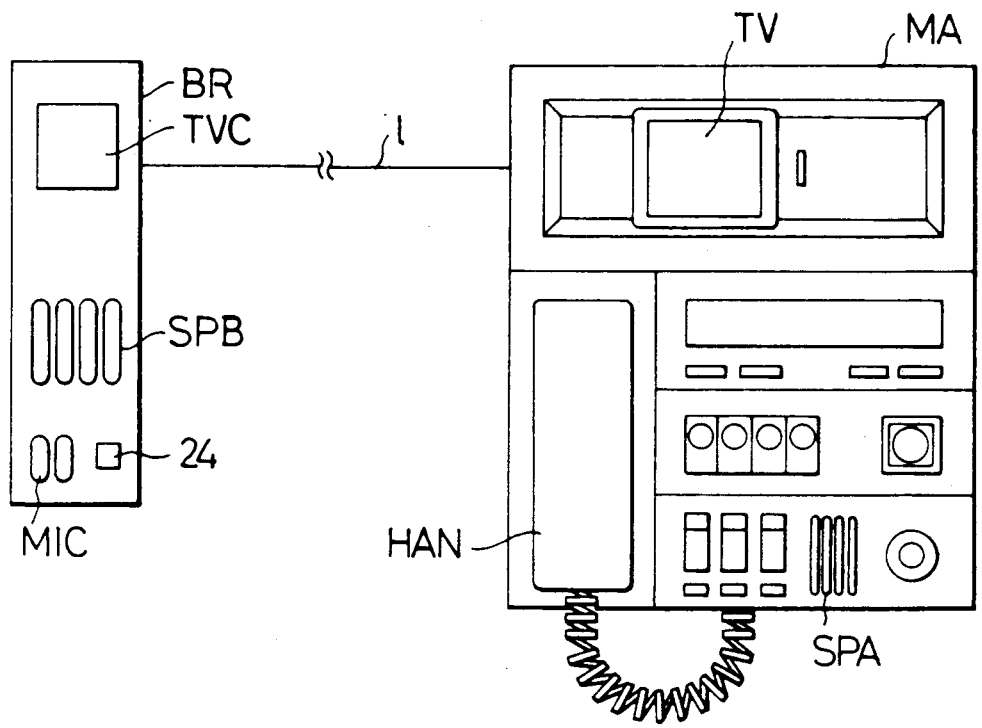
FIG. 5 is a schematic plan view showing the whole of the system of FIG. 1.

The foregoing television interphone system may be provided to have such exterior appearance as shown, for example, in FIG. 5, in which the system will be of such a practical circuit as shown, for example, in FIG. 6. In this system, the master device MA is provided, in addition to the speaker SPA, with a handset HAN and a monitoring television TV, the handset HAN being connected to a frequency modulation circuit 16 and a frequency demodulation circuit 17 which are connected to the balanced input/output circuit 11 while the monitoring television TV being connected to an image signal amplifying circuit 18 which is connected also to the balanced input/output circuit 11. In the branch device BR, on the other hand, there are provided, in addition to the calling push button 24, a microphone MIC, speaker SPB and a television camera TVC, the foregoing balanced input/output circuit 22 being connected through a frequency demodulation circuit 26 to the microphone MIC and through an image signal amplifying circuit 28 to the television camera TVC. With this arrangement, the user can communicate with the visitor without any interference upon transmission of first FM waves having first carrier frequency from the master device MA to the branch device BR and second FM waves having second carrier frequency from the branch device BR to the master device MA, while the user can visually confirm who the visitor is.

Figure 7:
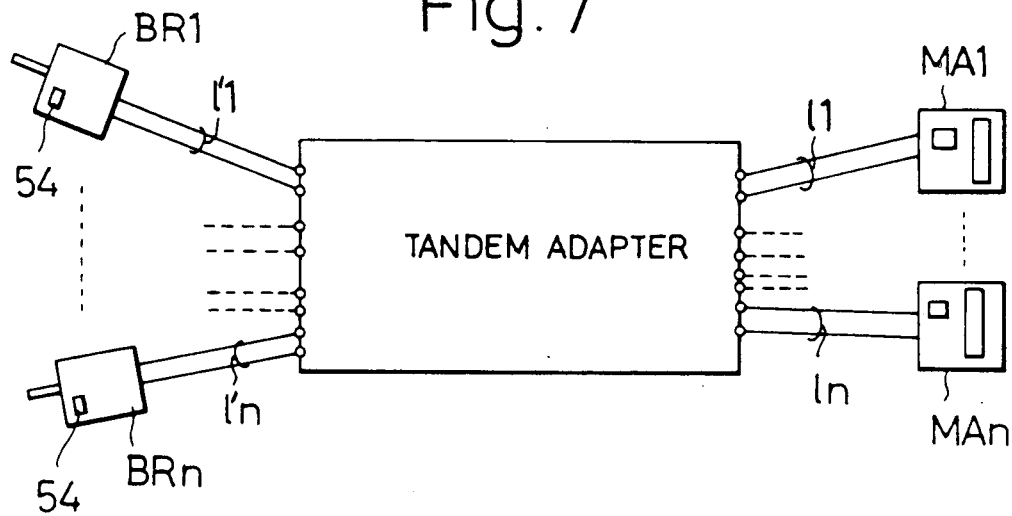
FIG. 7 is a schematic explanatory view for another embodiment of the system according to the present invention.

While the foregoing embodiment shown in FIGS. 1 through 6 provides the arrangement of 1:1 of the master and branch devices MA and BR, there is provided by another feature of the present invention another arrangement of N:N of N master devices and N branch devices. Referring now to FIG. 7, a plurality of master devices MA1 through MAn are connected to a plurality of branch devices BR1 through BRn respectively through each of two-wire signal lines 11 through 1n and 1'1 through 1'n with a tandem adapter 60 interposed between them. Referring more specifically to this with reference to FIG. 8, the partial signal lines 11 through 1n on the side of the master devices MA1 through MAn ar connected, within the tandem adapter 60, to a master-device selection means 61 through master-device connection lines 621 through 62n to which each of a plurality of means 631 through 63n for detecting the operation of the master devices is respectively connected. The other partial signal lines 1'1 through 1'n on the side of the branch devices BR1 through BRn are connected, also within the tandem adapter 60, to a branch-device selection means 64 through branch-device connection lines 651 through 65n to which each of a plurality of means 661 through 66n for detecting the operation of the branch devices is respectively connected. The master-device selection means 61 and the branch-device selection means 64 are mutually connected through a two-wire signal line 57 connected to the master-device connection lines 621-62n through each of series circuits of one-way buffer amplifiers 681 through 68n with their input end disposed on the side of the branch-device selection means 64, dummy loads 691 through 69n each connected across output terminals of the respective amplifiers 681-68n, and change-over parts 701 through 70n.

In the arrangement of FIG. 8, the system on standby causes a voltage to be applied from one of the master devices MA1-MAn to the respective branch devices BR1-BRn, one master device having been initially set to be connected in direct current manner to the branch devices BR1-BRn through one of the signal lines 11-1n, one of the master-device connection lines 621-62n, master-device selection means 61, signal line 67, branch-device selection means 64 and signal lines 1'1-1'n, as separated from one of the dummy loads 691-69n at the change-over parts 701-70n controlled by a control signal S from the master-device selection means 61. Now, as the calling push button 54 of one of the branch devices BR1-BRn is operated, the standby voltage is forcibly instantaneously dropped by the particular branch device, and this voltage drop is detected by one of the branch-device operation detecting means 661-66n in the tandem adapter 60, which detecting means corresponds to the particular branch device. This voltage variation during the standby is also transmitted to the respective master devices MA1-MAn through one course of one of the signal lines 1'1-1'n, one of the branch-device connection lines 651-65n, branch-device selection means 64, signal line 67, master-device selection means 61, master-device connection lines 621-62n and signal lines 11-1n, and through the other course of the signal line 67, buffer amplifiers 681-68n for both the image signal and the frequency modified waves of talking-voice signals, dummy load parts 691-69n, change-over parts 701-70n, master-device connection lines 621-62n and signal lines 11-1n. When the standby voltage drop is detected by a corresponding branch-device operation detecting means 661-66n, its detection signal is transmitted to the branch-device selection means 64, and the signal line and branch-device connection line of the particular branch device the push button 54 of which is operated are connected through the branch-device selection means 64 to the signal line 67 in the tandem adapter 60, with a low loss.

Among the master devices MA1-MAn started with the detection of the variation in the standby voltage, the one initially set so as to be connected to the signal line 67 separated from the dummy load parts 691-69n at the change-over parts 701-70n controlled by the control signal S from the master-device selection means 61 transmits an operation voltage to the particular one of the branch devices BR1-BRn the push button 54 of which has been operated, through one of the signal lines 11-1n, one of the master-device connection lines 621-62n, master-device selection means 61, signal line 67, branch-device selection means 64, one of the branch-device connection lines 651-65n and one of the signal lines l'1-l'n, so that the particular branch device will be enabled to transmit its image and talk signals. The signal lines of other started master devices than the above are connected through the master-device connection lines to the dummy load parts at the change-over parts controlled by the master-device selection means 61, so as to be in a state being separated from the signal line 67, and the operation voltage is kept being supplied with the dummy load parts as a load.

As has been described, the television interphone system according to the present embodiment thus terminates the start operation and shifts to the talk operation. The master device which has shifted to the talk operation carries out a timer operation so that the talk operation will be forcibly terminated in 30 seconds when the handset HAN is in on-hook state and in about 3 minutes in off-hook state of the handset HAN that is, when the talk is carried out. When, on the other hand, the on- or off-hook state of the handset HAN is not monitored in the tandem adapter 60, whether or not the respective master devices are in talking state is determined at the detecting means 63 for the master device operation by discriminating if the line voltage at the master-device connection line connected to the signal line of the respective master device is of a value of the operation voltage or of the standby voltage and, if the value is of the operation voltage, the system is regarded to be in the talking state but, if the value is of the standby voltage, it is regarded to be in non-talking state. In an event where the master device in the talking state is not the one which has been initially set for supplying the operation voltage upon the starting but is on of other master devices, the talking through this other master device is enabled only for the 30 second period of the on-hook state operation of the initially set master device, and the operation voltage supply from the initially set master device will be terminated at the end of that period normally so as not to allow any more talking. Here, the detecting means 63 for the master device operation detects the master device in the talking stat with the handset in off-hook state and provides a detection output to the master-device selection means 61 before the termination of the supply of the operation voltage by the initially set master device, the change-over part 70 is thus controlled by the master-device selection means 61 to have the master device which keeps supplying the operation voltage separated from the dummy load parts but to connect the master-device connection line of this master device through the master-device selection means 61 to the signal line 67 with the low loss, and the operation voltage is kept applied to the branch device. At the same time, the initially set master device and the dummy load part are connected, and the master-device connection line of the particular master device is separated from the signal line 67 by the master-device selection means 61.

The hook state of the handset HAN of the respective master devices MA1-MAn can be monitored by the master-device operation detecting means 631-63n as in the foregoing manner so that the master devices MA1-MAn are subjected all the time properly to the selection after the starting of the master devices MA1-MAn by one of the branch devices BR1-BRn, the operation voltage is kept transmitted from one of the master devices MA1-MAn to one of the branch devices BR1-BRn in accompaniment to the selection, and the talk between one of the master devices MA1-MAn and one of the branch devices BR1-BRn is enabled continuously.

Figure 10:
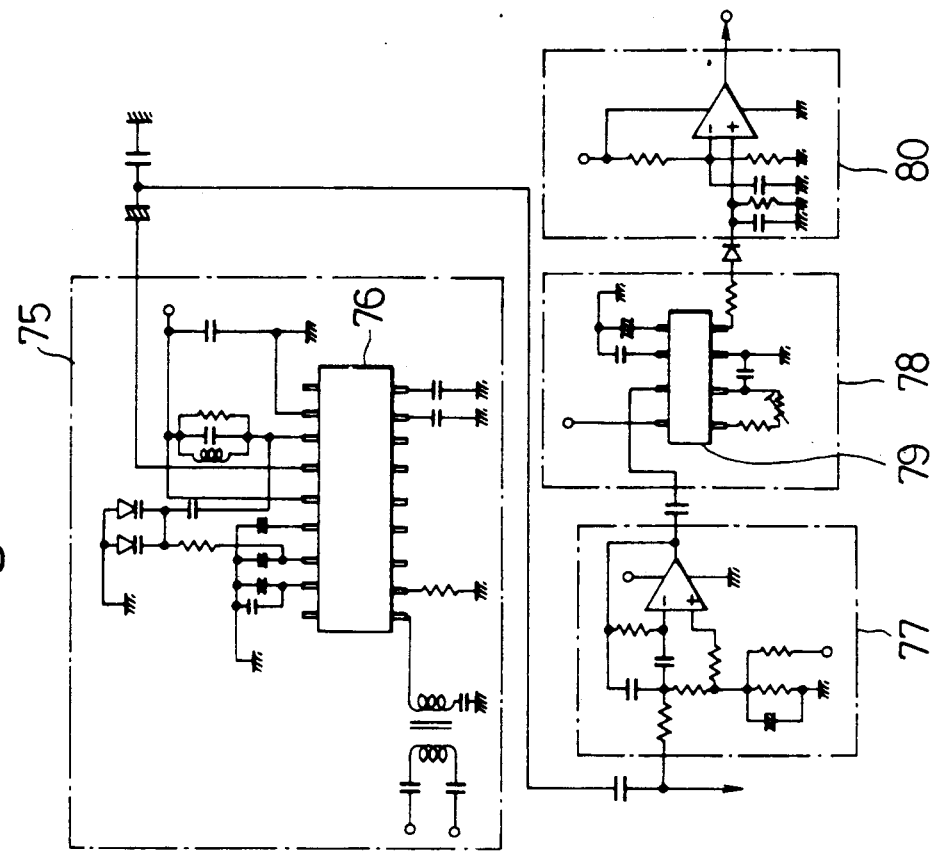
FIG. 10 is a circuit diagram in a working aspect of means for detecting an operation of the master device in the system of FIG. 7.
Figure 9:
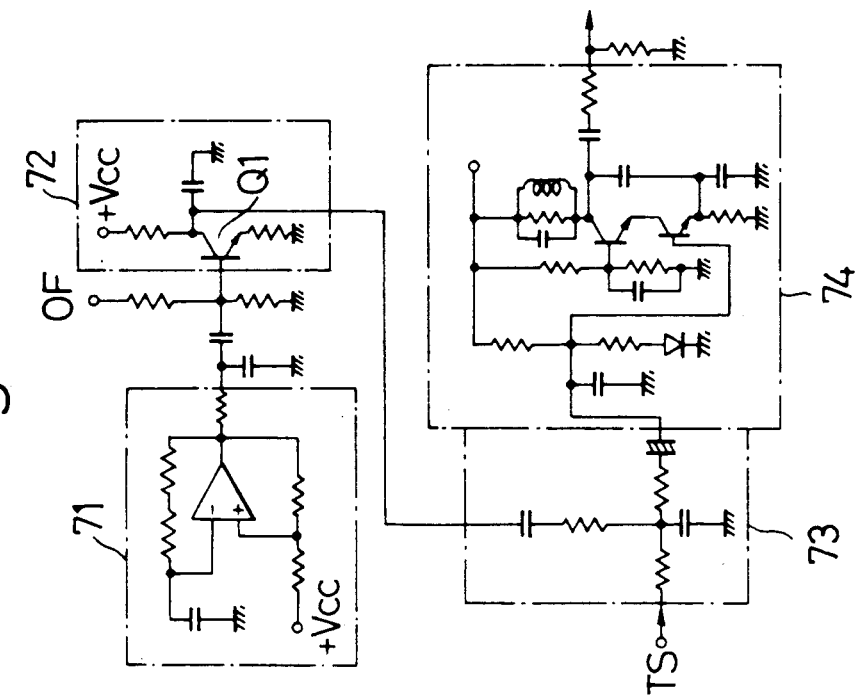
FIG. 9 is a circuit diagram in a working aspect of a transmitting means actuatable with an operation of handset in a master device in the system of FIG. 7.

By the way, in monitoring the off-hook information, there are provided, as shown in FIG. 9, a tone signal generating circuit 71 which generates a tone signal of such frequency band as 20 KHz out of a frequency band of talking voice signal, a switch circuit 72 including a transistor Q1 which receives at a base an off-hook signal OF upon the off-hooking of the handset HAN of the master device so as to turn the transistor Q1 ON for passing the tone signal, a mixing circuit 73 which mixes the tone signal passed through the switch circuit 72 with the talking voice signal TS from the handset HAN, and a frequency modulation circuit 74 which frequency-modulates a carrier wave of, for example, 6.5 MHz by the mixed signal for transmitting the off-hook information formed by the talking voice signal and tone signal. The master-device operation detecting means 631-63n respectively comprises, as shown in FIG. 10, a frequency demodulation circuit 75 including a generally used IC 76 for demodulating received frequency-modulated waves, a high pass filter 77 allowing only the tone signal to pass therethrough out of the signals demodulated at the demodulation circuit 75, a tone decoder circuit 78 including a generally used tone decoder IC 79 for decoding the tone signal passed through the high pass filter 77, and a comparison circuit 80 made ON by a decoder output to provide a detection signal of the off-hook signal, so that the off-hook of the handset HAN at any one of the master devices MA1-MAn can be reliably detected at the master-device operation detecting means 631-63n.

Figure 11:
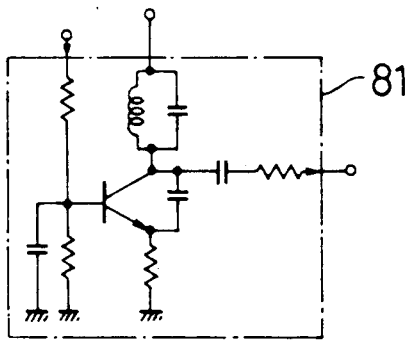
FIG. 11 is a circuit diagram in another working aspect of the transmitting means actuatable with the operation of handset of the master device in the system of FIG. 7.
Figure 12:
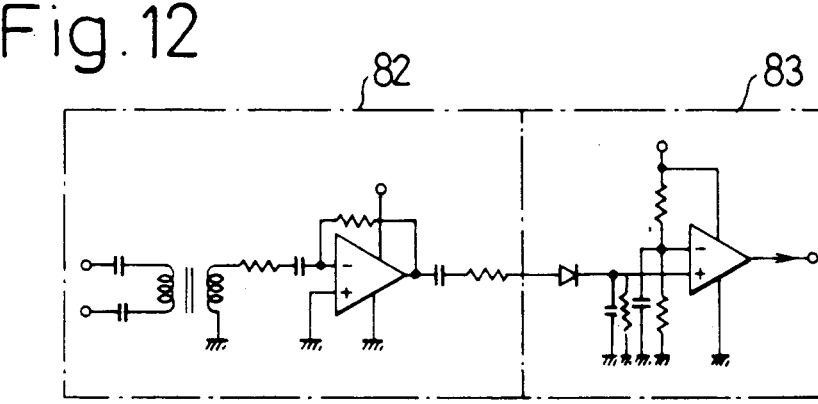
FIG. 12 is a circuit diagram in another working aspect of the means for detecting the operation of the master device in the system of FIG. 7.

As another off-hook information means, the master devices MA1-MAn are respectively made to have such off-hook signal generating circuit 81 as shown in FIG. 11 and comprising a Collpits oscillator actuated upon receipt of the off-hook signal OF, so that a signal of other carrying frequency of, for example, 10.7 MHz than that of the carrier wave for the image signal and talking voice signal will be generated for transmission upon the off-hook of the handset HAN, while the master-device operation detecting means 631-63n are provided with, such as shown in FIG. 12, a received-signal amplifying circuit 82 which receives and amplifies a signal of, for example, 10.7 MHz, and a comparison circuit 83 which generates a detection signal when the signal from the circuit 81 continues for a fixed period of time and its integrated value exceeds a fixed level, so that the off-hook of the handset HAN can be detected by means of a reception of the signal of 10.7 MHz.

Figure 13:
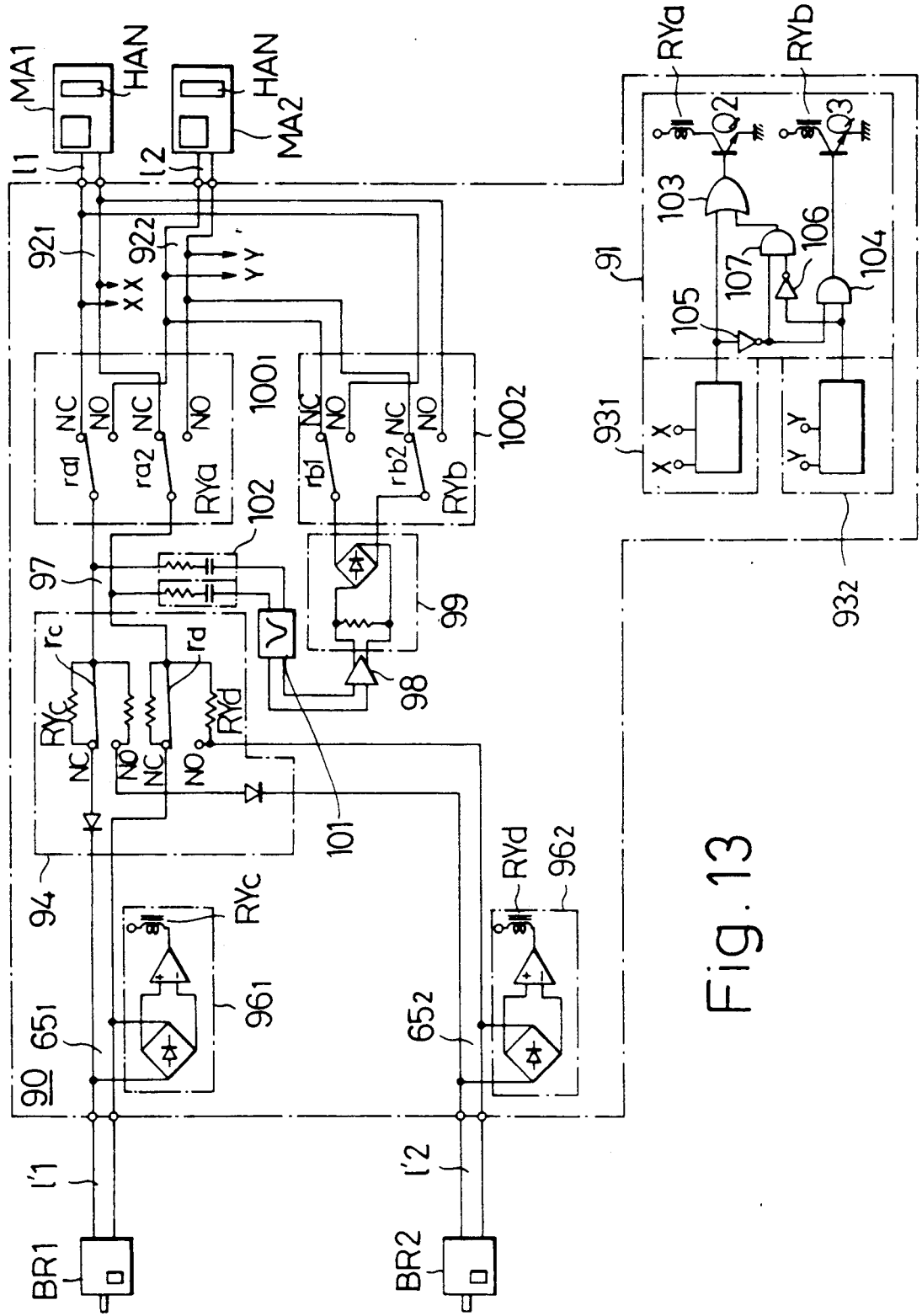
FIG. 13 is a detailed circuit diagram showing a further embodiment of the system according to the present invention.

Referring now to FIG. 13, there is shown a system according to the present invention, which comprises, by setting N=2, two master devices and two branch devices. In the present system, the standby voltage is supplied from the master devices MA1 or MA2 to the branch devices BR1 and BR2, through signal lines l1 or l2, master-device connection lines 921 or 922, normally closed terminals NC of relay contacts ra1 and ra2 in change-over parts 1001 and 1002, signal line 97, and branch-device selection means 94. The standby voltage is applied through a resistor connected in parallel with normally open terminals NO of relay contact rc in the branch-device selection means 94, so that the branch devices BR1 and BR2 on standby show a high impedance to allow only a very small amount of current to flow therethrough, whereby a voltage across the signal lines l'1 and l'2 on the branch device side is set to be the standby voltage, so as not to be influenced by the presence of the resistors. To the signal line 97 connecting between the relay contacts ra1 and ra2 of a relay RYa and rc and rd of relays RYc and RYd, input terminals of a buffer amplifier 98 are connected through a removal filter 101 and a direct-current cutting circuit 102, while a dummy load part 99 is connected across output terminals of the buffer amplifier 98.

Further, one master device MA1 is connected through the signal line l1 and master-device connection line 921 to the NC terminals of the relay contacts ra1 and ra2 of the relay RYa and also to the NO terminals of the relay contacts rb1 and rb2 of the relay RYb, while the other master device MA2 is connected through the signal line l2 and master-device connection line 922 to the NO terminals of the relay contacts ra1 and ra2 and also to the NC terminals of the relay contacts rb1 and rb2, and the dummy load part 99 is inserted between common terminals of the relay contacts rb1 and rb2. Further to the master-device connection lines 921 and 922, master-device connection detecting parts 931 and 932 ar respectively connected, so that detection outputs of these detecting parts 931 and 932 will be provided to a logic circuit of a master-device selection means 91.

As has been described, the system of FIG. 13 is so arranged that, when one master device MA1 or MA2 is connected to the signal line 97 through the relay contacts ra1 and ra2 of the master-device selection means 91, the other master device MA2 or MA1 is in a state of being connected t the dummy load part 99 through the relay contacts rb1 and rb2 of the relay RYb forming the change-over part 1002, so that the buffer amplifier 98, dummy load part 99 and change-over parts 1001 and 1002 are commonly utilized by the both master devices MA1 and MA2. While the dummy load part 99 comprises a circuit having a resistance value corresponding to a power consumption capacity of the branch device, it may be an element the resistance value of which is infinity, that is, an open type. Further, it may be possible to render the standby and operation voltages to be of the same level voltage but to provide a difference between the standby and the operation in the current value supplied to the branch device or in the period of time for which the current is supplied to the branch device. Further, it is also possible to arrange the system so that the standby voltage may be provided to the branch devices not from the master devices but from the tandem adapter 90, or that such tandem adapter 90 may be incorporated entirely in the master or branch device.

Figure 14:
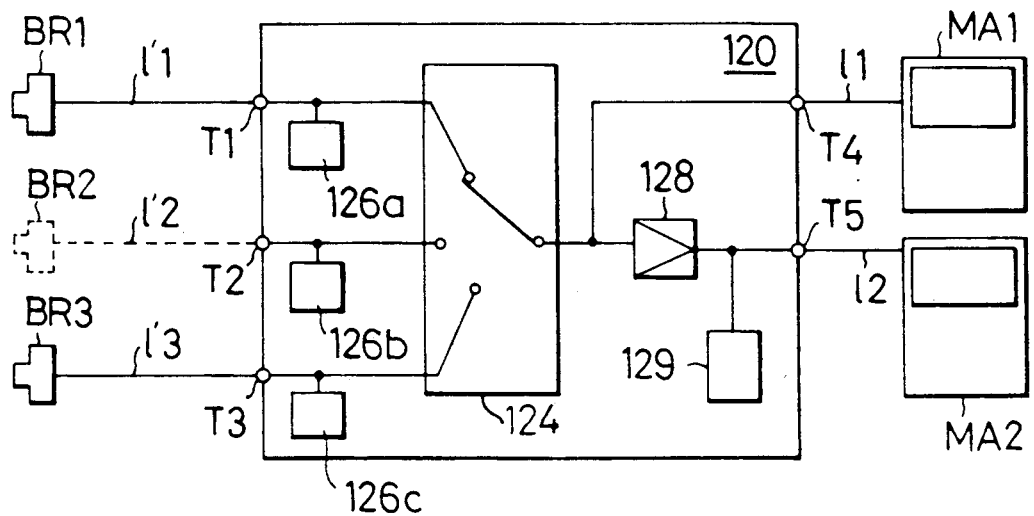
FIGS. 14 through 16 are block diagrams showing respectively each of still further embodiments of the system according to the present invention.

According to another feature of the system according to the present invention, the master and branch devices are provided in different number, and either one of the master and branch devices may be provided in single, instead of a plurality. Thus, in FIG. 14, there is shown schematically a system in which two of the master devices MA1 and MA2 and three of the branch devices BR1, BR2 and BR3 are employed. In the present instance, a tandem adapter 120 is provided therein with a switch 124 which operates at every fixed time interval to sequentially change over connected one of terminals T1–T3 of the branch devices BR1–BR3 to terminals T4 and T5 of the master devices MA1 and MA2. Provided in this system that the branch device BR2 is not connected to the terminal T2, a deterioration in the efficiency possibly occurs due to non-operation for the interval assigned to this branch device BR2 without any measure therefor, and means 126a, 126b, and 126c for detecting a voltage across terminals T1–T3 are connected respectively to the branch-device connection lines so that a high voltage resulting from a constant voltage supplied from the master device side to the terminal T2 to which no branch device is connected will be detected by the means 126b and the change over from the terminal T2 to the terminal T3 will be remarkably shortened in time to prevent the deterioration from occurring in the operational efficiency. While in FIG. 14 there are shown only buffer amplifier 128 and dummy load parts 129, the same arrangement as in the foregoing embodiments shown in FIGS. 1 through 13 can be similarly employed for attaining substantially the same operation and effect.

Figure 15A:
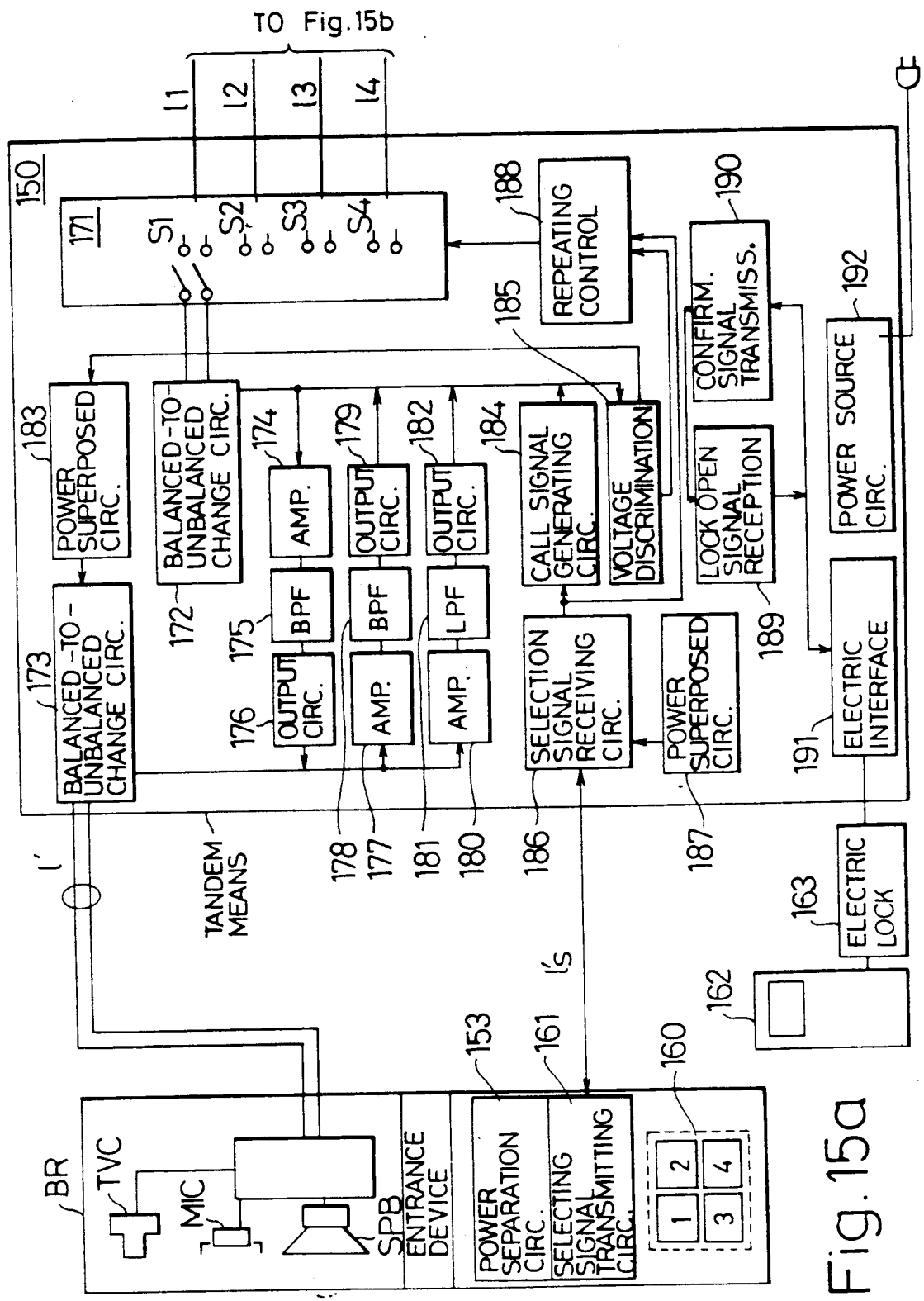

Referring next to FIG. 15, there is shown a television interphone system according to the present invention which can be effectively employed in the condominiums or apartment houses. In the present instance, a single branch device is connected through a tandem adapter 150 to a plurality of the master devices MA1–MA4, the latter of which are respectively provided in each apartment of different family homes in the condominium and thus may be regarded as "home" devices, while the former branch device is to be installed at a common entrance of the condominium and may be regarded as an "entrance" device. In this entrance device BR, substantially the same television camera TVC, speaker SPB, and microphone MIC as in the foregoing embodiments ar concurrently provided, normally for the same operation as in the foregoing embodiments. In order to allow a visitor to call a predetermined one of the home devices MA1–MA4, the entrance device BR comprises a set of numbered key buttons 160 and a selection signal transmitting circuit 161, such DTMF signal as employed in key telephone systems is utilized as the selection signal, which signal is to be transmitted through a two-wire signal line l's to the tandem adapter 150. An entrance door 162 adjacent to which the entrance device BR is disposed is provided with a remote-controlled electric lock 163.

The home devices MA1–MA4 are respectively provided with the television monitor TV, speaker SPB, and handset HAN (not shown in FIG. 15) which function in the same manner as in the foregoing embodiments, and further comprise, means 165 for transmitting a signal for unlocking the electric lock 163, means 166 for receiving an unlock confirming signal returned from the electric lock 163, and means 167 for generating a confirmation sound upon receipt of the unlock confirming signal, wherein the respective signals are transmitted through the signal lines l1–l4.

The tandem adapter 150 is arranged for transmitting the respective signals as superposed on each other between the entrance device BR and one of the home devices MA1-MA4 which is appointed by means of the entrance device BR, through the respective signal lines l1-l4 and l'. More specifically, the signal lines l1-l4 are connected respectively through each pair of paired contacts S1-S4 of a relay group 171 to a first balanced-to-unbalanced change circuit 172, while the entrance-device side signal line l' is connected to a second balanced-to-unbalanced change circuit 173, which change circuits 172 and 173 realizing an impedance matching between the respective exterior signal lines l and the interior circuits of the tandem adapter 150. Modulated voice signal provided out of the first balanced-to-unbalanced change circuit 172 connected to the home devices MA1-MA4 is amplified by an amplifier 174 and is provided as an input to the second balanced-to-unbalanced change circuit 173 through a band-pass filter 175 and output circuit 176. Modulated voice signal from the entrance device BR as provided out of the second change circuit 173, on the other hand, is amplified by an amplifier 177 and provided into the first change circuit 172 through a band-pass filter 178 and an output circuit 179. The image signal from the entrance device BR as provided out of the second change circuit 173 is amplified by an amplifier 180 and also provided into the first change circuit 172 through a low-pass filter 181 and an output circuit 182. To the signal line l' connecting between the second balanced-to-unbalanced change circuit 173 and the entrance device BR, a power supply is performed from a power superposing circuit 183 as superposed on the signals transmitted.

Further, a call-signal generating circuit 184 generates a signal for calling one of the home devices when a home-device selection signal is received at a selection signal receiving circuit 186, and this call signal is provided through the first balanced-to-unbalanced change circuit 172 to one of the signal lines l1-l4. A voltage discriminating circuit 185 detects through the first change circuit 172 a voltage level of a direct current component on the signal lines l1-l4, and discriminates in accordance with result of the detection the operating state and non-operating state of the home devices. The selection signal receiving circuit 186 is to receive the selection signal from the selection signal generating circuit 161 of the entrance device BR, and selects one of the signal lines l1-l4 which is connected to the selected one of the home devices MA1-MA4. A further power superposing circuit 187 provided in the adapter 150 supplies an operating power through a transmission line l's connected to the selection signal generating circuit 161 to a unit of the numbered key buttons 160 and the selection signal generating circuit 161. A repeating control circuit 188 is to connect the first balanced-to-unbalanced change circuit 172 to one pair of the paired contacts S1-S4 which is connected to the selected one of the home devices MA1-MA4 in accordance with the selection signal received from the selection signal receiving circuit 186.

In the tandem adapter 150, there is included means for controlling the electric lock 163, and this control means comprises a lock open signal reception circuit 189, confirming signal transmission circuit 190, and electric lock interface 191, so that a lock open signal from the home device will unlock the normally locked electric lock 163 of the entrance door 162 through the lock open signal reception circuit 189 and interface 191, while the thus unlocked lock 163 provides the unlock confirming signal through the interface 191 and confirming signal transmission circuit 190 to one of the home devices MA1-MA4 which is in the operating state. To the both power superposing circuits 183 and 187, a power is supplied from a power source circuit 192 connected to a commercial power source.

While in the embodiment of FIG. 15 there has been shown an example of using four of the master "home" devices MA, their number can be properly varied. Other arrangement and operation of this embodiment are the same as those in the foregoing embodiments, and an effective television interphone system with the master and branch device in n:1 combination can be realized, as will be readily appreciated. It is of course possible to provide a system employing a single master device and a plurality of branch devices with a slight design modification.

Figure 16:
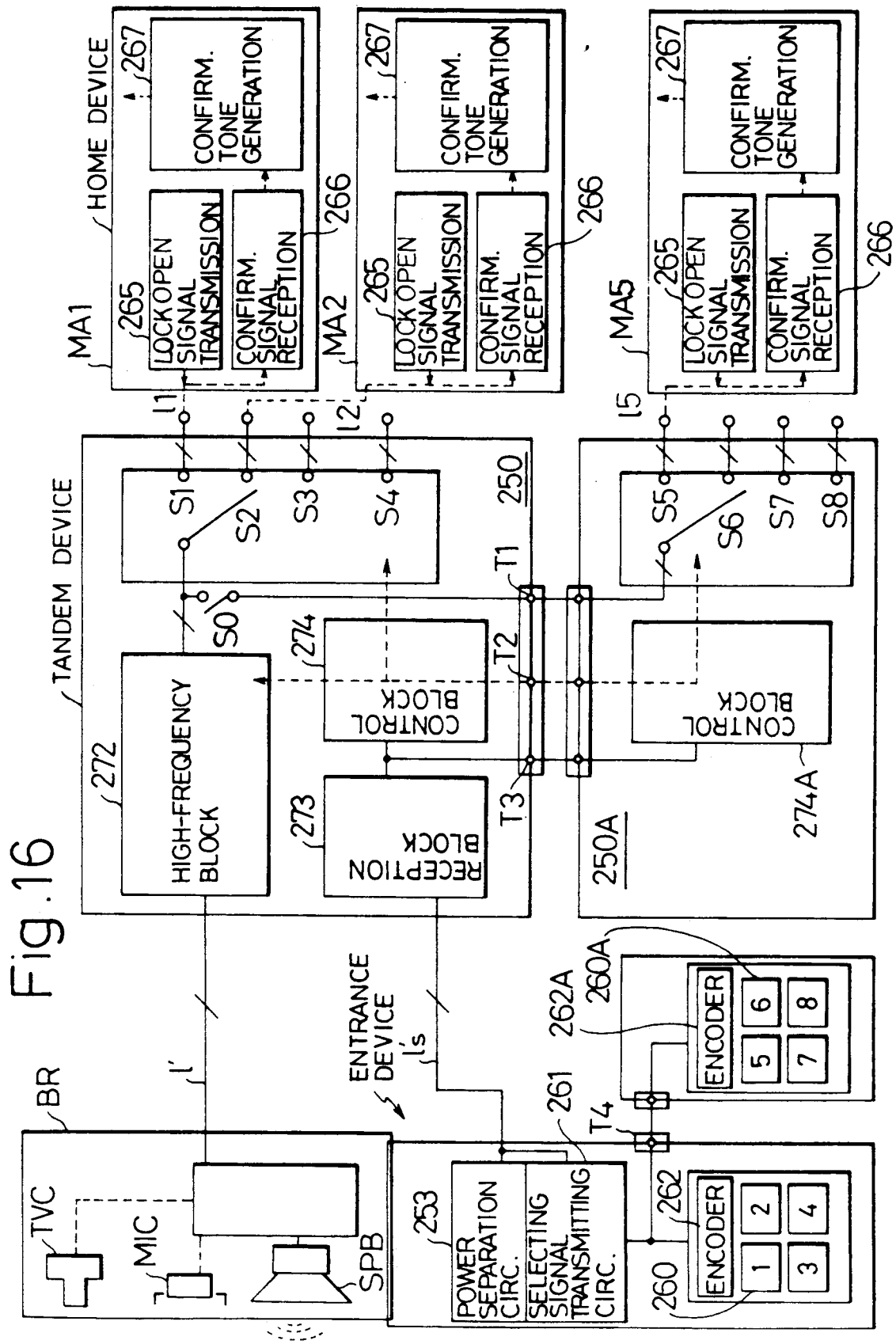

According to still another feature of the present invention, there can be taken an arrangement in which the capacity of the tandem adapter can be readily increased when the master devices are increased in number. Referring to FIG. 16, the arrangement of the home or master devices and the entrance or branch device slightly differs from the embodiment of FIG. 15 in respect that the entrance device BR is made to incorporate an encoder 262 in the unit of numbered key buttons 260 and selection signal transmitting circuit 261, and that an additional set of numbered key buttons 260A having an encoder 262A is provided as branched through a terminal T4 from the entrance device BR, but all other basic arrangements are substantially the same as those in the system of FIG. 15, and the same components as in FIG. 15 are denoted by the same reference numerals but added by 100. While in FIG. 16 a first tandem adapter 250 is shown schematically, it ma be of the same arrangement as that in the foregoing embodiments. On the other hand, the first tandem adapter 250 in the present instance is provided with an additional second adapter 250A connected through additional terminals T1-T3 of the first adapter 250. In the present instance, it is preferable that the second adapter 250A commonly utilizes other components than such transmission line change over means as a high-frequency block 272 and reception block 273 in the first adapter 250.

What is claimed is:

1. A two-wire television interphone system comprising a master device disposed indoors for use by a user and including a power source means, talking means, call-signal receiving means and television monitor;

a branch device installed outdoors for use by a visitor and including a power source means, calling means, talking means, call-signal generating means and television camera; and a two-wire signal line connected between said master device and said branch device for transmitting call signals, voice signals, image signals and a power signal, each superposed on one another, said calling means in said branch device being responsive to a calling operation causing, through said two-wire signal line, said call-signal receiving means in said master device to actuate in response to the calling operation and said television camera to take an image of the visitor for visual confirmation by the user on said television monitor, and said talking means in said master device enabling communication to be carried out through said talking means in the branch device with the visitor;

wherein the system further comprises means provided in said master device for discriminating a variation in a voltage on said signal line upon the calling operation of the call-signal receiving means, and means provided in said branch device for controlling said line voltage as driven by said line voltage discriminating means to actuate said call-signal generating means in the branch device, the system being thereby caused to shift between a standby state and an operation state upon discrimination of said line voltage variation.

2. The system according to claim 1, which further comprises a second means provided in said branch device for discriminating a variation in a voltage on said signal line and controlling a supplied voltage.

3. The system according to claim 1, wherein said line voltage controlling means in said branch device renders the line voltage to be of a waveform having a down-slope portion and an up-slope portion each determined by a predetermined RC time constant upon the shift in the operation state, so as to cause no influence on a signal of said image of said visitor taken in response to said operation of said calling means.

4. The system according to claim 1, wherein said line voltage control means in said branch device includes a diode connected between said calling means and said power source means for changing over the control of the line voltage control means between a call in said standby state and a call in said operation state.

5. The system according to claim 1, wherein said branch device is capable of supplying power to said master device.

6. The system according to claim 1, wherein said master and branch devices are respectively provided in a plurality, and said plurality of master devices and said plurality of branch devices are mutually connected through a tandem adapter for selecting a branch device in the operation state and one of said master devices corresponding to the selected branch and connected between the selected branch and the master devices; said tandem adapter comprising a branch device operation detecting means which detects a variation in a standby voltage to generate a control output, a branch-device selection means responsive to said control output to enable an operation voltage and respective signals to be transmitted to one of the branch devices which has been subjected to the actuation by the visitor of said calling means, a master-device operation detecting means for detecting a signal representing actuation by the user of one of the master devices as transmitted through the signal line and providing a detection signal, a master-device selection means responsive to said detection to select said one master device actuated to enable said operation voltage to be transmitted from the master device actuated to the branch device operated, a buffer amplifying means which transmits signals from the branch device to the master device in one way, a dummy load means capable of absorbing said operation voltage, and a change-over means which controls a connection of said dummy load means to the master devices.

7. The system according to claim 6, wherein said tandem adapter is separated from said master devices in standby state of the system and transmits said standby voltage to said branch devices, and the tandem adapter is connected to the master devices after calling operation.

8. The system according to claim 6, wherein there are two master devices and two branch devices, and said buffer amplifying means, dummy load means, and change-over means are commonly utilized by said two master devices.

9. The system according to claim 6, wherein said actuation signal of said master device is subjected to a multiple transmission at a frequency other than that of said voice and image signals.

10. The system according to claim 6, wherein said tandem adapter further comprises means for sequentially changing over respective terminals to which said branch devices are connected, and means connected to said terminals of said terminal change-over means for detecting a voltage between the terminals so that, upon a detection of said voltage between the terminals higher than a voltage upon connection of the branch device to one of the terminals, said one terminal is refrained from being connected to the branch device.

11. The system according to claim 1, wherein said master device is provided in a plurality, and which further comprises a tandem adapter including a further line voltage discriminating means, said tandem adapter connecting between said master devices and said branch device.

12. The system according to claim 11, wherein said tandem adapter includes means for changing over said connection of said master devices to the tandem adapter, and said line voltage discriminating means of the tandem adapter releases said change-over connection when a rise of said voltage on said signal line between the master devices and the tandem adapter is not detected within a predetermined period of time.

13. The system according to claim 11, wherein said tandem adapter includes means for changing over said connection of said master devices to the tandem adapter, and said line voltage discriminating means of the tandem adapter releases said change-over connection when a fall of said voltage on said signal line between the master devices and the tandem adapter is detected.

14. The system according to claim 11, wherein said line voltage discriminating means tandem adaptor interrupts its detection of said voltage on said signal line for a fixed period of time after a rise and a fall of the voltage.

15. The system according to claim 11, wherein said line voltage discriminating means tandem adaptor has different reference voltages set with respect to a rise and a fall of said voltage on said signal line.

16. The system according to claim 11, which further comprises an additional tandem adapter connectable to said tandem adapter for connection therethrough of an additionally provided master device to said branch device, said additional tandem adapter including an additional change-over means and utilizing in common respective other means than said change-over means in said tandem adapter.

* * * * *

UNITED STATES PATENT AND TRADEMARK OFFICE
CERTIFICATE OF CORRECTION

PATENT NO. : 5,032,820

DATED : July 16, 1991

INVENTOR(S) : Tanikawa et al

It is certified that error appears in the above-identified patent and that said Letters Patent is hereby corrected as shown below:

Column 13, line 51, after "detection" insert --signal--.

Column 14, line 46, after "means" insert --of said--;
        line 51, after "means" insert --in said--.

Signed and Sealed this

Second Day of March, 1993

Attest:

STEPHEN G. KUNIN

*Attesting Officer*     *Acting Commissioner of Patents and Trademarks*